US009553791B2

(12) United States Patent
Uttaro et al.

(10) Patent No.: US 9,553,791 B2
(45) Date of Patent: Jan. 24, 2017

(54) VIRTUALIZATION OF CONTROL PLANE NETWORK ELEMENTS

(71) Applicant: AT&T INTELLECTUAL PROPERTY I, L.P., Atlanta, GA (US)

(72) Inventors: James Uttaro, Staten Island, NY (US); Eric Rosenberg, Lincroft, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/872,357

(22) Filed: Oct. 1, 2015

(65) Prior Publication Data

US 2016/0020991 A1    Jan. 21, 2016

Related U.S. Application Data

(63) Continuation of application No. 13/678,649, filed on Nov. 16, 2012, now Pat. No. 9,172,579.

(51) Int. Cl.
*H04L 12/715* (2013.01)
*H04L 29/06* (2006.01)
*H04L 12/733* (2013.01)
*H04L 12/721* (2013.01)

(52) U.S. Cl.
CPC .............. *H04L 45/04* (2013.01); *H04L 29/06* (2013.01); *H04L 45/12* (2013.01); *H04L 45/126* (2013.01)

(58) Field of Classification Search
None
See application file for complete search history.

(56) References Cited

U.S. PATENT DOCUMENTS

| 8,233,395 | B2 | 7/2012 | Elias et al. |
| 2006/0062175 | A1 | 3/2006 | Ling et al. |
| 2012/0069847 | A1 | 3/2012 | Saad et al. |
| 2012/0144066 | A1 | 6/2012 | Medved et al. |
| 2013/0329605 | A1 | 12/2013 | Nakil et al. |
| 2014/0064283 | A1 | 3/2014 | Balus et al. |

OTHER PUBLICATIONS

Final Office Action for U.S. Appl. No. 13/678,649, dated Jan. 28, 2015, 10 pages.
Non Final Office Action for U.S. Appl. No. 13/678,649, dated Jun. 23, 2014 13 pages.

*Primary Examiner* — Huy D Vu
*Assistant Examiner* — Teisha D Hall
(74) *Attorney, Agent, or Firm* — Cantor Colburn LLP

(57) ABSTRACT

A system includes a first regional network including a first network element; a second regional network including a virtualized control plane network element, the virtualized control plane network element supporting a routing protocol at the first regional network, the routing protocol employing a location-based cost model; and a network connection connecting the virtualized control plane network element to the first regional network, the network connection having a network connection cost, the network connection cost applied in the location-based cost model to support the routing protocol at the first regional network.

9 Claims, 3 Drawing Sheets

VIRTUALIZATION OF CONTROL PLANE NETWORK ELEMENTS

CROSS-REFERENCE TO RELATED APPLICATIONS

This application is a continuation of U.S. patent application Ser. No. 13/678,649, filed Nov. 16, 2012, the entire contents of which are incorporated herein by reference.

BACKGROUND

The present disclosure relates generally to virtualization of network elements, and more particularly, to methods, systems, and computer program products for virtualization of control plane network elements.

Virtualization of network elements is a cost effective way of centralizing network functions, reducing capital expenses and reducing operation expenses. Exemplary services that can be virtualized include web servers, firewalls, application servers, etc. One drawback to virtualization occurs when the virtualized network element employs a cost determination based on the location of the virtualized network element relative to other network elements in the network. Since the virtualized network element is not physically located where the service is provided, location-based cost determinations may be inaccurate.

BRIEF SUMMARY

Exemplary embodiments include a system including a first regional network including a first network element; a second regional network including a virtualized control plane network element, the virtualized control plane network element supporting a routing protocol at the first regional network, the routing protocol employing a location-based cost model; and a network connection connecting the virtualized control plane network element to the first regional network, the network connection having a network connection cost, the network connection cost applied in the location-based cost model to support the routing protocol at the first regional network.

Other exemplary embodiments include a method including providing a virtualized control plane network element at a second regional network, the virtualized control plane network element supporting a routing protocol at a first regional network, the routing protocol employing a location-based cost model; establishing a network connection from the virtualized control plane network element to the first regional network; assigning the network connection a network connection cost; and applying the network connection cost in the location-based cost model to support the routing protocol at the first regional network.

Other exemplary embodiments include a computer program product embodied on a tangible computer readable storage medium, the computer program product including instructions for causing a processor to execute a method including providing a virtualized control plane network element at a second regional network, the virtualized control plane network element supporting a routing protocol at a first regional network, the routing protocol employing a location-based cost model; establishing a network connection from the virtualized control plane network element to the first regional network; assigning the network connection a network connection cost; and applying the network connection cost in the location-based cost model to support the routing protocol at the first regional network.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
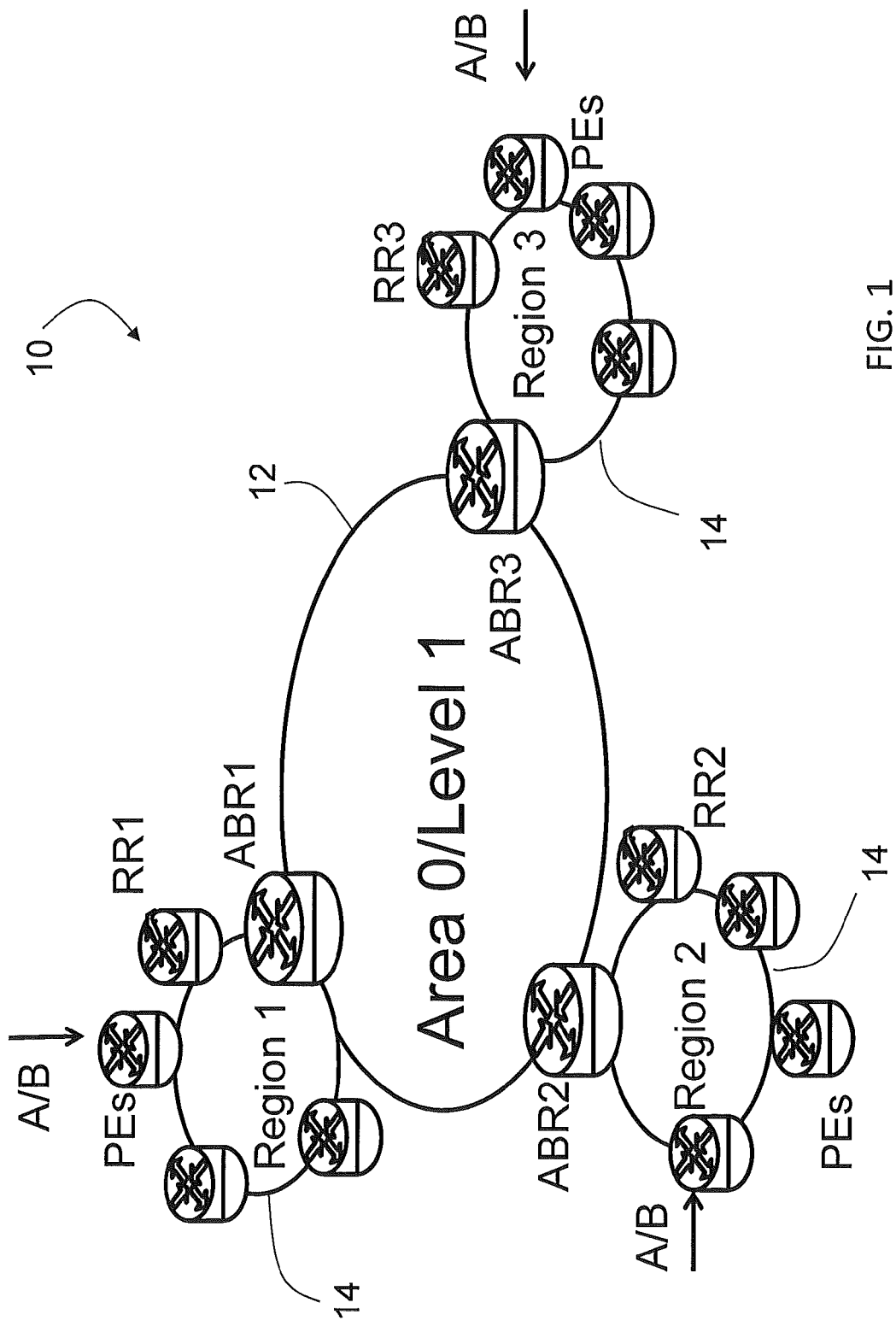
FIG. 1 depicts an example of a conventional network architecture.

FIG. 1 depicts an example of conventional network architecture 10. The network includes a backbone level network 12, referred to as area 0/level 1 as known in the art. Coupled to the backbone level 12 are regional networks 14, including region 1, region 2 and region 3. Regional networks 14 correspond to, for example, networks serving distinct geographical locations. Each regional network 14 includes an area border router (ABR1, ABR2 and ABR3) for coupling to the backbone level 12. Each regional network 14 includes, among other elements, provider edge routers (PE) and a route reflector, labeled RR1, RR2 and RR3. The route reflector is a control plane network element that broadcasts paths to other network elements in the regional network as known in the art.

In operation, a route advertisement A/B is received at a provider edge router PE of each regional network. In the route advertisement, A is the address (e.g., and IPv4 or IPv6 address) and B is the mask length. The routers of the each regional network 14 determine a best path for the destination identified in the route advertisement using a routing protocol. The routing protocol may employ a location-based cost model (e.g., cost proportional to latency between network elements). For example, the routing protocol may be based on border gateway protocol BGP "hot potato" routing in which an interior gateway protocol (IGP) cost is used to select the best path. The route reflector RR may also serve as a node in the path, and as such, will contribute to the cost for paths including the RR.

Figure 2:
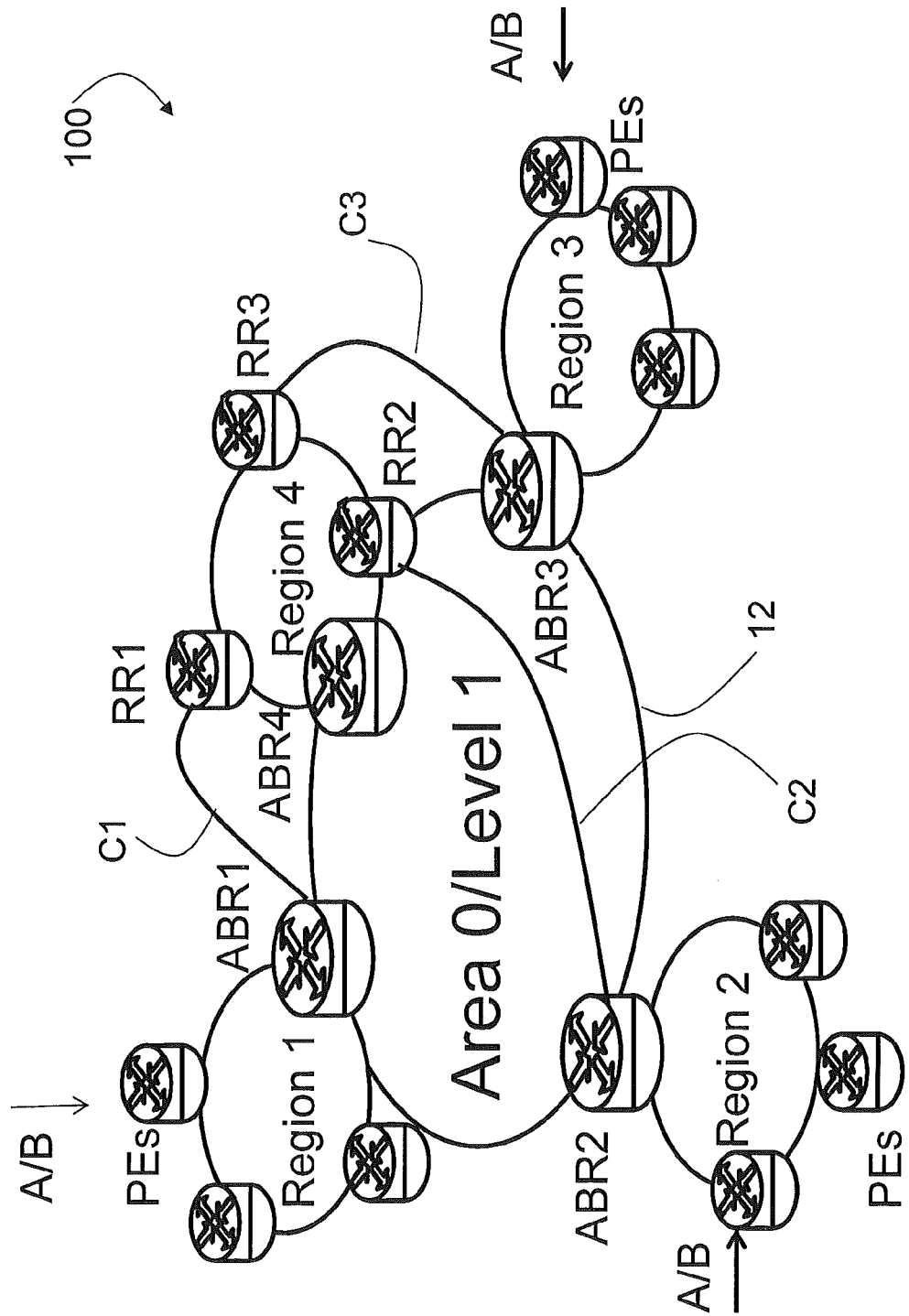
FIG. 2 depicts a network architecture having virtualized network elements in an exemplary embodiment.

FIG. 2 depicts network architecture 100 having virtualized control plane network elements in an exemplary embodiment. In FIG. 2, the route reflectors RR1, RR2 and RR3 are virtualized in region 4, distanced from regions 1-3. Region 4 is a regional network coupled to the backbone level 12 through area border router ABR4. The virtualized route reflectors RR1, RR2 and RR3 in region 4 are implemented using one or more servers providing an instance of the route reflectors for regions 1-3, respectively. Regional network 4 may correspond to a cloud data center providing centralized services. In this architecture, when a route advertisement A/B is received at region 1, region 2 and region 3, the cost determination used by the routing protocol (e.g., the IGP cost) will be inaccurate, as the route reflectors RR1, RR2 and RR3 are now physically located outside of region 1, region 2 and region 3, respectively. This will cause the actual cost of a path to be incorrect, which will break basic service paradigm cost models such as hot potato routing. This will also break future location-based cost models whereby a RR should reflect its geographic location and peer with PEs in its same general area.

To provide a proper cost measure, a network connection is provided from each virtualized route reflector in region 4 to each regional network. The network connection may be a secure connection (e.g., a tunnel) established using known techniques. Network connection C1 provides a connection between virtualized route reflector RR1 and area border router ABR1. Network connection C2 provides a connection between virtualized route reflector RR2 and area border router ABR2. Network connection C3 provides a connection between virtualized route reflector RR3 and area border router ABR3. Each network connection C1, C2 and C3 is assigned a network connection cost that is considered by the routing protocol when applying a location-based cost model to determine best path routing. The network connection cost may be assigned by the entity establishing the virtualized route reflectors and the network connection. Using network connections between the virtualized route reflectors and the regional networks provides a mechanism for the virtualized network elements to appear to be in the same local region as the provider edge routers supported by the virtualized network elements.

It is noted that control plane network elements may be virtualized in a regional network having a physical control plane network element. For example, regional network in region 3 may include a route reflector for region 3. Further, the regional network in region 3 may also include a virtualized route reflector for region 2. A network connection would be provided from the virtualized route reflector in region 3 to the ABR2 in region 2.

Figure 3:
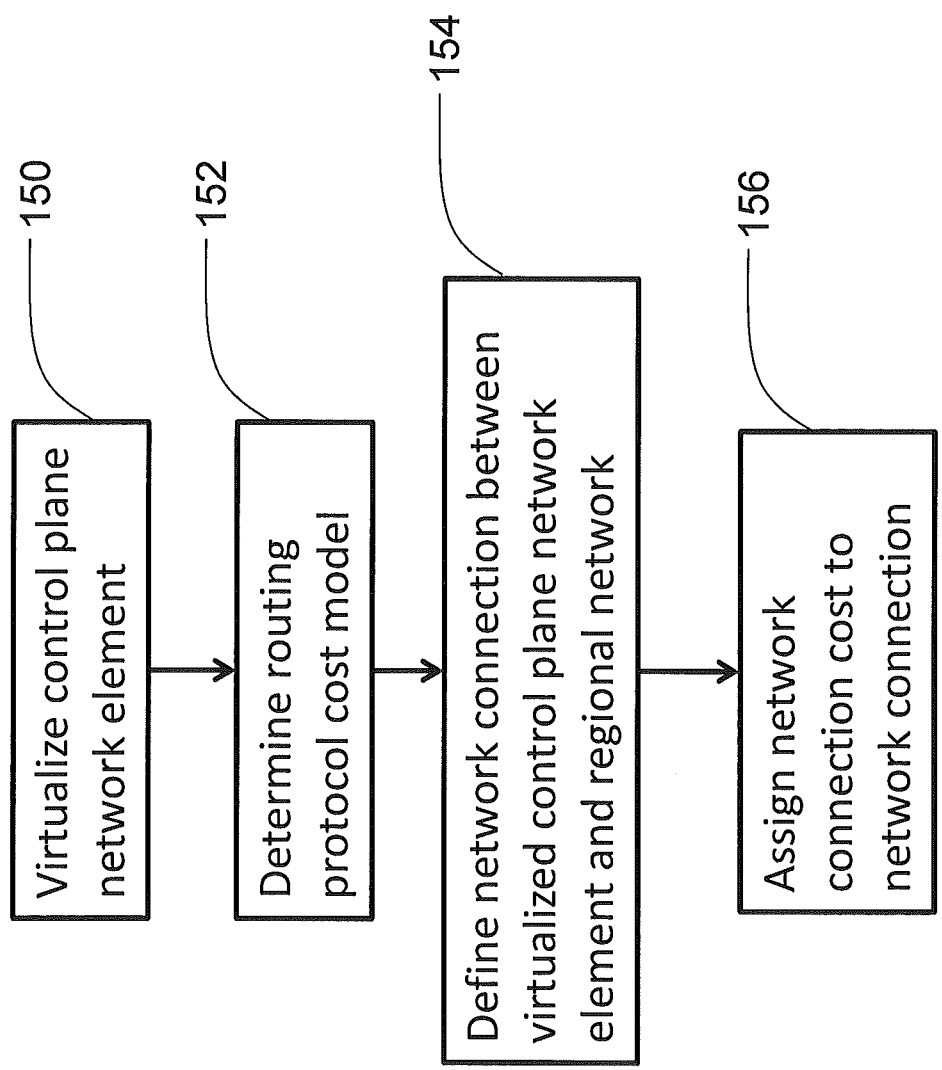
FIG. 3 depicts a method for virtualizing a network element in an exemplary embodiment.

FIG. 3 depicts a process for virtualizing a control plane network element in an exemplary embodiment. The process begins at 150 where the control plane network element is virtualized. As noted above, this may involve using a server to support an instance of the control plane network element remotely from the region supported by the virtualized control plane network element. At 152, a location-based cost model for the routing protocol employed by the virtualized control plane network element is determined. In the example above, the location-based cost model is the IGP cost used for best exit hot potato routing. It is understood that other routing protocol costs may be used.

At 154 a network connection between the virtualized control plane network element and the regional network it supports is defined. In the example of FIG. 2, the network connection is a secure connection (e.g., a tunnel) between the virtualized control plane network element and an area border router ABR. It is understood that other network connections may be employed depending on network configuration. At 156 a network connection cost is assigned to the network connection based on the location-based cost model used by the virtualized control plane network element. As described above, the network connection cost is used when applying the routing protocol to provide the appearance that the virtualized control plane network element is physically located in the region it supports.

Embodiments described herein refer to virtualization of a route reflector, but it is understood that any control plane network element (e.g., rendezvous point) may be virtualized using the techniques described herein. Further, the virtualized control plane network element may represent a portion of a network element residing in a different region. For example, a control plane portion of a switch may be virtualized in region 4 while the physical switch fabric resides in region 1. A network connection, and the associated network connection cost, is used for location-based cost model determinations as described herein.

The cost used by the routing protocol and the network connection cost may be based on a variety of factors, including latency, distance, etc., and generally refers to a cost factor used in a routing protocol having a location-based cost model. The IGP cost used for BGP hot potato best exit routing is an example, and other cost models associated with other routing protocols are considered within embodiments of the invention.

As described above, the exemplary embodiments can be in the form of processor-implemented processes and devices for practicing those processes, such as a server in a regional network or cloud data center. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:
1. A system comprising:
a first regional network including a first network element, the first regional network element including a provider edge router;
a second regional network including a virtualized control plane network element, the virtualized control plane network element executing a routing protocol for the first regional network, the routing protocol employing a location-based cost model, the virtualized control plane network element providing an instance of a control plane network element for the first regional network; and a network connection connecting the virtualized control plane network element to the first regional network, the network connection having a network connection cost, the network connection cost applied in the location-based cost model to support the routing protocol at the first regional network;

the first regional network comprising an area border router coupling the first regional network to a backbone level network;

wherein the network connection connects the virtualized control plane network element to the area border router;

wherein the network connection cost is assigned upon creation of the network connection;

wherein the virtualized control plane network element is a control plane portion of a physical network element located in the first regional network.

2. The system of claim 1 wherein:
the virtualized control plane network element is a route reflector.

3. The system of claim 1 wherein:
the network connection is a secure tunnel.

4. A method comprising:
providing a virtualized control plane network element at a second regional network, the virtualized control plane network element executing a routing protocol for a first regional network, the first regional network element including a provider edge router, the routing protocol employing a location-based cost model, the virtualized control plane network element providing an instance of a control plane network element for the first regional network;

establishing a network connection from the virtualized control plane network element to the first regional network;

assigning the network connection a network connection cost; and applying the network connection cost in the location-based cost model to support the routing protocol at the first regional network;

wherein establishing the network connection includes connecting the virtualized control plane network element to an area border router in the first regional network;

wherein the network connection connects the virtualized control plane network element to the area border router;

wherein the network connection cost is assigned upon creation of the network connection;

wherein the virtualized control plane network element is a control plane portion of a physical network element located in the first regional network.

5. The method of claim 4 wherein:
the virtualized control plane network element is a route reflector.

6. The method of claim 4 wherein:
the network connection is a secure tunnel.

7. A computer program product embodied on a tangible computer readable storage medium, the computer program product including instructions for causing a processor to execute a method, comprising:
providing a virtualized control plane network element at a second regional network, the virtualized control plane network element executing a routing protocol for a first regional network, the first regional network element including a provider edge router, the routing protocol employing a location-based cost model, the virtualized control plane network element providing an instance of a control plane network element for the first regional network;

establishing a network connection from the virtualized control plane network element to the first regional network;

assigning the network connection a network connection cost; and applying the network connection cost in the location-based cost model to support the routing protocol at the first regional network;

wherein establishing the network connection includes connecting the virtualized control plane network element to an area border router in the first regional network;

wherein the network connection connects the virtualized control plane network element to the area border router;

wherein the network connection cost is assigned upon creation of the network connection;

wherein the virtualized control plane network element is a control plane portion of a physical network element located in the first regional network.

8. The computer program product of claim 7 wherein:
the virtualized control plane network element is a route reflector.

9. The computer program product of claim 7 wherein:
the network connection is a secure tunnel.

* * * * *